(12) United States Patent
Germanovich et al.

(10) Patent No.: US 11,270,805 B2
(45) Date of Patent: *Mar. 8, 2022

(54) EMERGENCY METHOD AND SYSTEM FOR IN-SITU DISPOSAL AND CONTAINMENT OF NUCLEAR MATERIAL AT NUCLEAR POWER FACILITY

(71) Applicant: Grand Abyss, LLC, Tulsa, OK (US)

(72) Inventors: Leonid N. Germanovich, Atlanta, GA (US); Lawrence C. Murdoch, Clemson, SC (US); Marvin Robinowitz, Tulsa, OK (US)

(73) Assignee: Grand Abyss, LLC, Tulsa, OK (US)

( * ) Notice: Subject to any disclaimer, the term of this patent is extended or adjusted under 35 U.S.C. 154(b) by 359 days.

This patent is subject to a terminal disclaimer.

(21) Appl. No.: 16/172,976

(22) Filed: Oct. 29, 2018

(65) Prior Publication Data

US 2019/0139658 A1 May 9, 2019

Related U.S. Application Data

(63) Continuation of application No. 15/262,881, filed on Sep. 12, 2016, now Pat. No. 10,115,489.

(51) Int. Cl.
*G21C 19/32* (2006.01)
*B09B 1/00* (2006.01)
(Continued)

(52) U.S. Cl.
CPC .............. *G21C 19/32* (2013.01); *B09B 1/008* (2013.01); *E21B 41/0057* (2013.01); *G21C 9/00* (2013.01);
(Continued)

(58) Field of Classification Search
CPC . G21C 19/32; G21C 9/00; G21D 1/02; G21D 3/06; G21F 9/24; B09B 1/008; E21B 41/0057
See application file for complete search history.

(56) References Cited

U.S. PATENT DOCUMENTS 3,108,439 A 10/1963 Reynolds et al.
3,131,763 A 5/1964 Kunetka et al.
(Continued)

FOREIGN PATENT DOCUMENTS

CN 102002356 A 4/2011
DE 3901920 A1 8/1989
(Continued)

OTHER PUBLICATIONS

Garagash et al., "Abyssal Sequestration of Nuclear Wate in Earth's Crust", "American Geophysical Union, Fall Meeting 2013, Abstratct#NG11A-1588", , Publisher: The Smithsonian/ASA Astrophysics Data System.

(Continued)

*Primary Examiner* — Jack W Keith
*Assistant Examiner* — Daniel Wasil
(74) *Attorney, Agent, or Firm* — GableGotwals

(57) ABSTRACT

A system and method to safely isolate mobile radioactive material during an emergency includes a borehole located in close proximity and at a depth sufficient to safely isolate the material and a man-made vertical-oriented gravity fracture located at the bottom end of the borehole. During an emergency, the mobile radioactive material enters the borehole and then passes from there into the gravity fracture. The mobile radioactive material may have sufficient density to further propagate the fracture vertically downward or a dense slurry or fluid could be mixed with the mobile radioactive material.

5 Claims, 4 Drawing Sheets

(51) Int. Cl.
  *E21B 41/00* (2006.01)
  *G21F 9/24* (2006.01)
  *G21C 9/00* (2006.01)
  *G21D 1/02* (2006.01)
  *G21C 9/016* (2006.01)
  *G21F 9/34* (2006.01)
  *G21D 3/06* (2006.01)

(52) U.S. Cl.
  CPC ............ *G21D 1/02* (2013.01); *G21F 9/24* (2013.01); *G21C 9/016* (2013.01); *G21D 3/06* (2013.01); *G21F 9/34* (2013.01); *Y02E 30/30* (2013.01)

(56) References Cited

U.S. PATENT DOCUMENTS

| | | | |
|---|---|---|---|
| 3,142,638 | A | 7/1964 | Blaisdell |
| 3,274,784 | A | 9/1966 | Shock |
| 3,379,013 | A | 4/1968 | Slagle et al. |
| 3,513,100 | A | 5/1970 | Stogner |
| 3,867,510 | A | 2/1975 | Miller et al. |
| 5,010,527 | A | 4/1991 | Mahrer |
| 5,133,624 | A | 7/1992 | Cahill |
| 5,191,157 | A | 3/1993 | Crocker |
| 5,338,493 | A | 8/1994 | Welch |
| 5,488,993 | A | 2/1996 | Hershberger |
| 5,489,740 | A | 2/1996 | Fletcher |
| 5,536,115 | A | 7/1996 | Keck |
| 5,589,603 | A | 12/1996 | Alexander et al. |
| 5,771,170 | A | 6/1998 | Withers et al. |
| 5,875,843 | A | 3/1999 | Hill |
| 5,961,438 | A | 10/1999 | Ballantine et al. |
| 6,002,063 | A | 12/1999 | Bilak et al. |
| 6,137,028 | A | 10/2000 | Snow |
| 6,312,515 | B1 | 11/2001 | Barlet-Gouedard et al. |
| 7,377,721 | B2 | 5/2008 | Patel |
| 9,190,181 | B2 | 11/2015 | Germanovich et al. |
| 2004/0023812 | A1 | 2/2004 | England et al. |
| 2009/0145659 | A1 | 6/2009 | Foppe |
| 2011/0148012 | A1 | 6/2011 | Cooper |
| 2016/0136701 | A1 | 5/2016 | Germanovich et al. |

FOREIGN PATENT DOCUMENTS

| | | |
|---|---|---|
| GB | 2151839 A | 7/1985 |
| JP | H02256791 A | 10/1990 |
| WO | 2013003796 A8 | 1/2013 |

OTHER PUBLICATIONS

Garagash et al., "Gravity driven hydraulic fracture with finite breadth", Oct. 1, 2014, Publisher: Society of Engineering Science 51st Annual Technical Meeting.

Liu Gonghui, et al., "similarity criterion in Simulation Experiment of Hydraulic Fracture", Oct. 31, 2000, pp. 45-48, vol. 24, No. 5, Publisher: Journal of China University of Petroleum (Edition of Social Sciences).

English Translation: Liu Gonghui, et al.; Jrnl of C, "similarity criterion in Simulation Experiment of Hydraulic Fracture", Oct. 31, 2000, vol. 24, No. 5, Publisher: ournal of China University of Petroleum(Edition of Social Sciences).

Liu Gonghui, et al., "similarity criterion in Simulation Experiment of Hydraulic Fracture", "includes English translation titled Development of scaling laws for hydraulic fracture simulation tests",, vol. 24, No. 5, Publisher: Journal of China University of Petroleum (Edition of Social Sciences).

Zhang Ping, "Research and Application of Hyposmosis Bottom Water Reservoir Fracturing Technology; China Doctor Dissertation Full-text Database, Engineering Technology I, No. 5 (includes Abstract in English)".

Zhang Ping, "Research and Application of Hyposmosis Bottom water Reservoir Fracturing Technology", May 15, 2011, No. 5, Publisher: China Doctor Dissertation Full-text Database, Engineering Technology 1.

Zhang Ping, "Research and Application of Hyposmosis Bottom Water Reservoir Fracturing Technology", , No. 5, Publisher: China Doctor Dissertation Full-text Database; Engineering Technology I.

Zhao Wanchun, "(Definition: Research of Evolution of Non-linear Damage of Hydraulically Fractured Rock); he Zhao dissertation discloses an external driving force for fracture extending in a rock and associated formulas—no image included—English version not availabl", "China Doctor Dissertation Full-text Database", , pp. 50-51, No. 3, Publisher: Engineering Technology I.

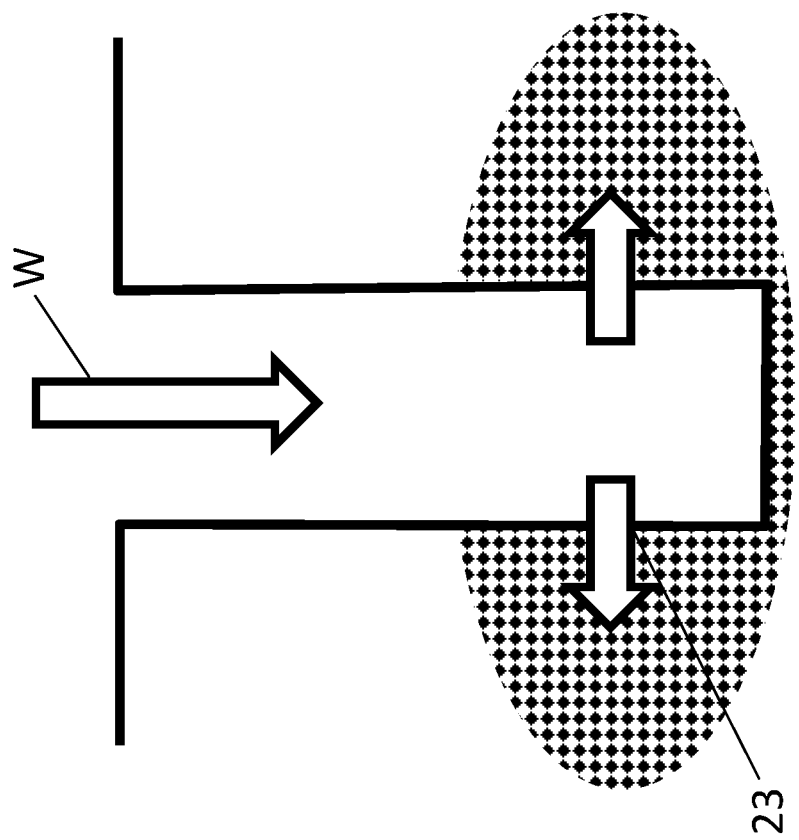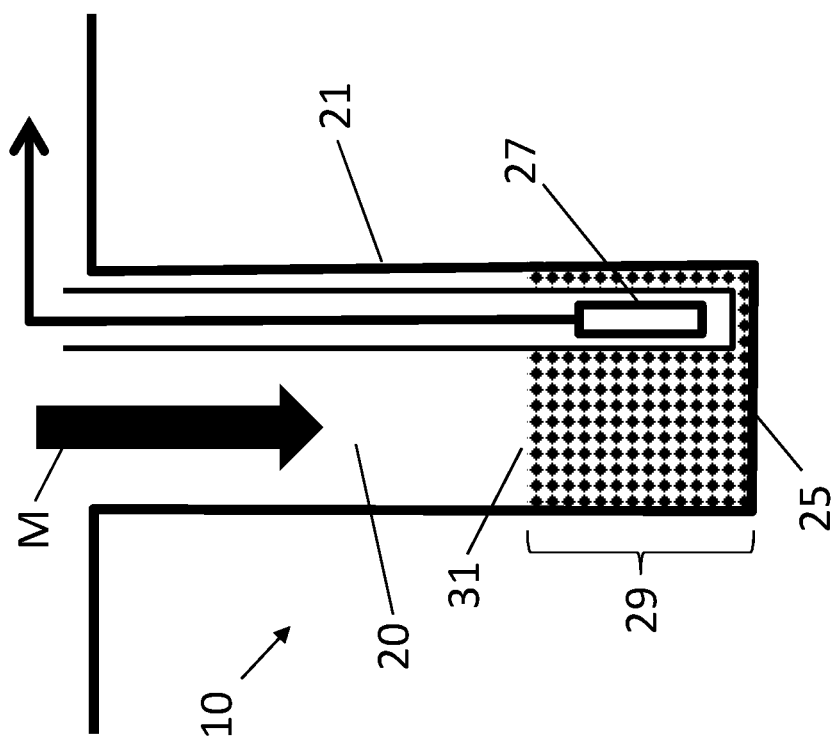

EMERGENCY METHOD AND SYSTEM FOR IN-SITU DISPOSAL AND CONTAINMENT OF NUCLEAR MATERIAL AT NUCLEAR POWER FACILITY

CROSS REFERENCE TO RELATED APPLICATIONS

The present application is a continuation of U.S. patent application Ser. No. 15/262,881 filed on Sep. 12, 2016. The subject matter of which is incorporated herein by reference.

BACKGROUND

This disclosure relates to hazardous material and nuclear waste disposal and, in particular, in-situ disposal of radioactive materials in real time during regular operations and during an emergency situation.

When a nuclear reactor core overheats to the point where at least one nuclear fuel element or rod exceeds its melting point, nuclear fuel and nuclear fission products can be exposed to coolant water resulting in an explosion. Subsequent failures can cause these radioactive materials to breach other layers of containment and be transported into the surrounding environment.

Should an overheating condition or meltdown condition occur, emergency procedures are usually in place to contain the spread of the radioactive material. However, none of those procedures can immediately dispose of the material in-situ in real time as the emergency occurs.

Plans are currently being developed for nuclear material or waste to be disposed of in deep boreholes (15,000 ft or 4,572 m) but the waste is first placed in specialized containment vessels which are then deposited into the borehole and cemented in. This approach is recognized as a way of isolating waste from exposure to humans or ecosystems, but the use of a containment vessel makes it unsuitable for emergency situations. Additionally, the borehole cannot be reused once cemented.

SUMMARY

An in-situ disposal system and method makes use of a borehole located in close proximity to a source of contaminated or radioactive material such as but not limited to a reactor core or an existing nuclear waste disposal site. The borehole is drilled into an acceptable rock such as but not limited to granite and gneiss and at a depth sufficient to safely isolate the radioactive material from the environment as well as from any potential water sources leaking into the borehole. The system and method are arranged so no off-site transportation of the radioactive material is required between the reactor core and the borehole. The system's design could function even if electrical or another power supply is unavailable.

Preferred embodiments of the system and method are intended to isolate hot solids or liquids, water, or liquids or fine-grained solids, or combinations of these materials, in a borehole. In one preferred embodiment, a fully cased borehole is partially filled with a porous material and a pump is used to keep the space above the porous material dry. This provides a dry borehole where molten material can be placed to safely isolate it from the environment and prevent or reduce the risk of steam explosions.

In another preferred embodiment, a packer with a pump are used to maintain a dry borehole where molten material can be placed. Gravel or other suitable material can be placed on top of the packer to create an insulating barrier to the downward movement of molten material.

In yet another preferred embodiment, the borehole casing is perforated and the perforation intersects a permeable zone such as a natural sand formation or a sand-filled hydraulic fracture where water could easily flow. This embodiment is used to safely isolate contaminated water and could be used to dispose of the water during an emergency rapidly enough to prevent contamination of the environment.

In still another preferred embodiment, a gravity fracture in the rock formation is located at or toward the bottom end of the borehole, with the radioactive material entering the gravity fracture and, optionally, propagating the gravity fracture further downward due to density effects.

In another preferred embodiment, a dense slurry or fluid mixed with the radioactive material creates and propagates the gravity fracture as the radioactive material is being disposed of.

The borehole optionally includes heating means located along at least a portion of its length to prevent molten material from solidifying too soon.

Objectives of this invention include providing a system and method that (1) disposes and contains radioactive material in-situ and subsurface, thereby eliminating the need to transfer the material off-site; (2) removes the material from its source—such as but not limited to a reactor core—and conveys the material into a deep borehole located in proximity to the source; (3) is available and ready at all times for emergency disposal and safe subsurface isolation of the material; (4) safely isolates hot solids or liquids, water, or liquids or fine-grained solids from the environment subsurface; (5) does not require a power source to dispose of the material; (6) reduces or eliminates the risk of steam generation and explosions during disposal; (7) manages the viscosity and temperature of the material during disposal; (8) accommodates disposal of other radioactive waste being stored on site, such as but not limited to waste previously stored in glass containment; (9) makes use of a prepared (in advance, before the emergency takes place) gravity fracture or creates a gravity fracture during disposal; (10) does not require the material to be placed in a containment vessel prior to disposal; and (11) could be monitored using monitoring wells.

BRIEF DESCRIPTION OF THE DRAWINGS

FIG. 1 is a schematic of a preferred embodiment of the system and method for in-situ disposal and containment of nuclear material at a nuclear power facility. A fully cased borehole with gravel at the bottom is created. A pumping means may be used to remove water and keep the borehole dry in the event that water finds a pathway into the borehole. Note that in this and other embodiments there may be an open hole or chamber below the casing or borehole. Hot material generated during an emergency is conveyed into the borehole to isolate it during an emergency. The borehole is kept dry to eliminate the chances of creating steam when the hot material contacts water.

FIG. 2 is a schematic of another preferred embodiment. The borehole is perforated and intersects a propped hydraulic fracture. Alternatively, the borehole intersects a deep geologic formation of sufficient permeability to accept the water being disposed of. Contaminated water is directed into the borehole in an emergency. Water could flow into the borehole by gravity in the event of loss of power, or it could be pumped into the borehole. This borehole could be a second on-site borehole in addition to the borehole of FIG. 1. The contaminated water could be water pumped from the borehole of FIG. 1.

ELEMENTS AND NUMBERING USED IN THE DRAWINGS AND DETAILED DESCRIPTION

Figure 4:
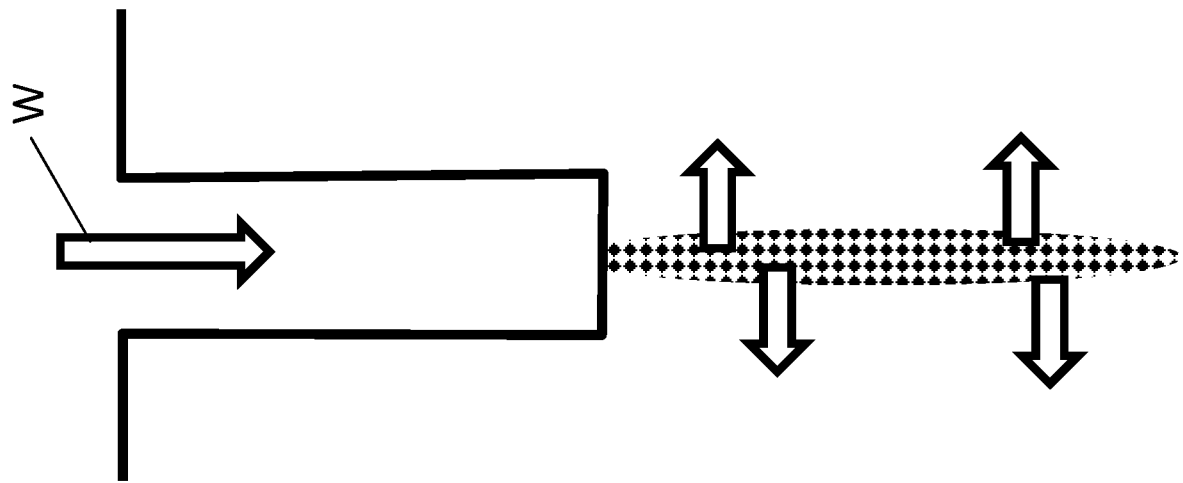
FIG. 4 is a schematic of another preferred embodiment that includes a borehole with a propped gravity fracture forming a permeable layer extending below the borehole. Water is introduced into the borehole and subsequently into the gravity fracture and enveloping formation. This embodiment will allow water to be rapidly isolated during an emergency in order to prevent contamination from spreading in the near surface environment.

10 System and Method of its Use
20 Borehole (or boring or well bore)
21 Casing
23 Perforations
25 Bottom or bottom end of 20
27 Pump or artificial lift device
29 Porous material (e.g. layer of gravel or its equivalent)
31 Top end of 29
40 Gravity fracture
M Hot material
R Reactor or source of radioactive material
S Dense slurry or fluid
W Water Definitions For the purpose of this disclosure, the following definitions apply:

Borehole—a hole bored or drilled in the earth and which can be uncased or fully or partially cased. A deep borehole is drilled to a safe depth below aquifer depths, preferably to a depth of at least 10,000 ft (3,048 m) and even more preferably to 15,000 ft (4,572 m).

Conveys—transport radioactive material from its source to a borehole by means other than rail-based or motorized vehicle. A conduit or piping system is an example of a non-rail-based or non-motorized means. Conveyance may also include dropping the material into the borehole.

Gravity fracture—a vertical (or near vertical) fracture in a rock formation that begins at a bottom end of a borehole, at a bottom end of an existing gravity fracture, or at a notch or seed created by conventional hydraulic fracturing, caused solely by a slurry or fluid that has a density greater than that of the rock formation or by a slurry or fluid that has a unit weight greater than the vertical gradient of the minimum horizontal compressive in-situ stress. A pressure-assisted gravity fracture is one in which external pressure is applied to the dense slurry or fluid.

Emergency isolation—measure undertaken or to be undertaken as the emergency unfolds or prior to existing emergency containment procedures being rendered ineffective or at maximum capacity.

Safely isolate—separate a radioactive material from any water aquifer or the terrestrial environment by disposing of it in a borehole, the radioactive material either remaining in the borehole or in a gravity fracture, horizontal fracture, or pore space within the rock formation.

Sufficient permeability—a pore space or hydraulic fracture within a rock formation that allows water exiting a perforated borehole casing to enter the formation or hydraulic fracture at a predetermined pressure or flow rate without causing a level of water within the borehole to rise above a predetermined level.

DETAILED DESCRIPTION

Preferred embodiments of a system and method for in-situ disposal and containment of nuclear waste removes nuclear material from a reactor core under near-meltdown or meltdown conditions and places that material in the deep subsurface to isolate it from the environment and from water sources that can cause steam explosions if the (high heat energy) material contacts water.

Steam explosions caused by hot nuclear material contacting water were primary causes of the spread of radioactivity during the events at Chernobyl and Fukushima. Isolating hot nuclear material from water sources reduces the risk of steam explosions during an emergency.

Moreover, the nuclear material in a reactor contains a large amount of radioactivity that itself poses a risk to the humans and ecosystems. Placing this radioactive material in a deep borehole would isolate it from pathways that could increase exposure risks to humans or ecosystems. For example, radioactive material placed in a deep borehole would be much better isolated from contact with humans or the environment compared to the same radioactive material allowed to remain in place (e.g., not in a borehole) during an emergency. Risks associated with placing radioactive material in a borehole could be evaluated in advance to provide a framework for improved and faster decision-making during an emergency.

Preferably, a conduit system connects the source of radioactive material with a source of pressurized fluid or air for injecting the radioactive material into the borehole. In embodiments that make use of gravity fracture at the bottom end of the borehole, the conduit system could also be connected to a source of weighting material for creating a dense fluid or slurry denser than a rock formation at the bottom end of the borehole. The material could be dropped rather than pumped into the borehole and, regardless of whether pumped or dropped, followed by cement or its equivalent to seal the borehole and to prevent radioactive materials from escaping.

Referring to FIG. 1, a system and method 10 makes use of a deep borehole 20 that is fully cased 21 with a tube made from steel or another suitable material to prevent inflow of groundwater. Should water find a pathway into the borehole, a pump 27 or other means for lifting water is installed in the bottom end 25 of the casing 21 and a layer of porous material such as gravel 29 is placed over the pump 27. The pump 27 is used to remove water that may accumulate by condensation or leakage through the steel-tubed casing 21 or other casing means.

A U-tube system may also be used to remove the water from the bottom end 25 of the borehole 20. A U-tube may consist of tubes and check valves that are arranged to lift water without requiring a power supply. An example U-tube system is found in B. M. Freifeld et al., *The U-Tube: A novel system for acquiring borehole fluid samples from a deep geologic $CO_2$ sequestration experiment*, B10203 J. Geophys. Res. (2005, vol. 110) herein incorporated by reference.

The porous material or layer of gravel 29 is used to limit the downward migration of hot material M. The top end 31 of the layer of gravel 27 should be safely above any water that might accumulate in the bottom end 25 of the casing 21, so it separates at a safe distance the hot material from the water. Heat transfer calculations of a kind known in the art can be used to determine this safe distance and, in combination with generally accepted safety practices, the height of the layer 27.

Hot material M is directed into the dry borehole 20 during an emergency. This could, for example, include molten, semi-molten, or hot nuclear fuel in solid form. The hot material would be displaced downward by gravity and would come to rest at the top end 31 of the gravel layer 29. After the material is isolated, the borehole 20 could be sealed with cement or related material to further isolate the hot material.

After the hot material M cools and solidifies, the material becomes immobilized in-situ. Heating means of a kind known in the art may be placed along the borehole 20 to control the material's temperature and ensure any melted material does not solidify at too shallow a depth or too soon in the borehole. Heating also provides an option to reduce the viscosity or to melt material during disposal.

There could be a gravity fracture 40 (see e.g. FIG. 3) created below this borehole 20 in advance of the disposal process or during the disposal process. The borehole 20 could be situated next to the reactor "R" or directly below the reactor R (see FIGS. 5 and 6). A monitoring well or wells, not shown, could be situated next to the borehole 20.

In another preferred embodiment the casing 21 on the boring 20 is perforated to access a pore space in the adjacent (permeable) formation such as a natural sand formation or a sand-filled hydraulic fracture where water could easily flow. This embodiment is used to isolate contaminated water and can dispose of it rapidly during an emergency (see e.g. FIGS. 2, 3, & 4). The borehole 20 now acts as a well. Water "W" (or other contaminated liquids) placed in the well flows out of the perforations 23 and into the formation where it is stored. The perforations 23 in the casing 21 would be located deep enough so water injected at this depth would be effectively isolated from fresh water aquifers or the terrestrial environment.

A borehole created in this manner provides a means for isolating water or other liquids from the environment during an emergency. The borehole would be equipped with a pump for injecting water. An alternative would be to allow water to flow into the well by gravity, without the use of a pump that requires a power supply. This provides a system and method for removing and isolating water in an emergency where access to the power needed to operate a pump might be unavailable. The water could be disposed of during or soon after the emergency. The borehole could be reused should another emergency situation arise.

A hydraulic fracture could be created at the bottom of the borehole to increase the flow rate into the formation per unit of pressure applied to the well. The contaminated water or fluid could be stored within the formation or within the hydraulic fracture or both. The borehole and fracture would be deep enough so that the orientation of any hydraulic fracture would be vertical or near vertical.

In one of the embodiments, a conventional hydraulic fracture is propped with sand and propagates laterally (see e.g. FIG. 2). In another embodiment, the hydraulic fracture is filled with a dense fluid and it propagates downward as a gravity fracture 40 (see FIG. 4). In both cases, permeable hydraulic fractures are created to increase the rate at which water flows out of the well per unit of pressure applied to the well.

Figure 3:
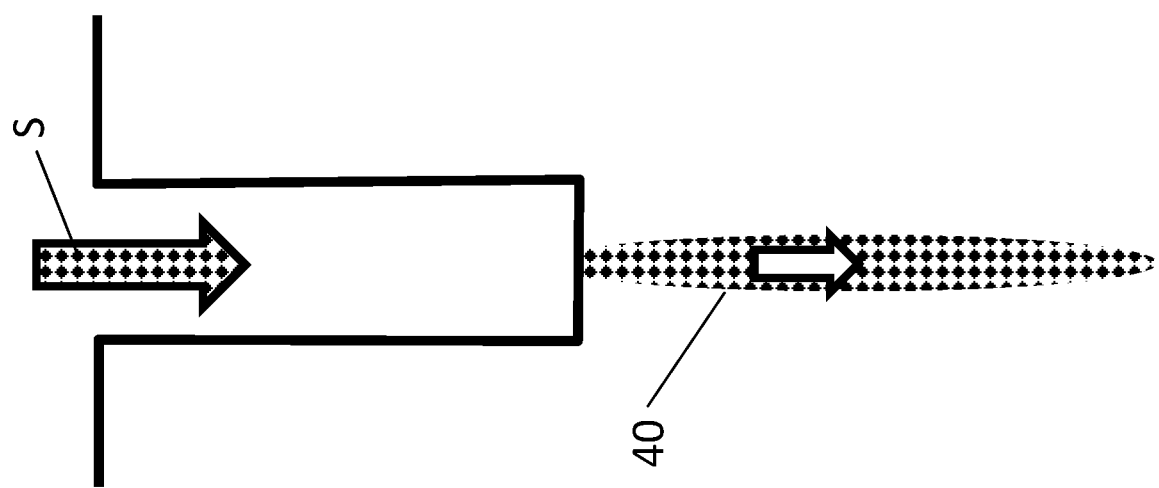
FIG. 3 illustrates another preferred embodiment. The disposal of radioactive material as a dense fluid is introduced into a borehole and creates a gravity fracture that extends downward. The gravity fracture may become long enough to propagate downward independently. The bottom of the wellbore and the top of the gravity fracture are deep enough to ensure that the stress state in the rock is such that the orientation of the gravity fracture is vertical (or nearly vertical). Conventional hydraulic fracturing could also be used in combination with the gravity fracture, for example, to create a "notch" or "seed" for the gravity fracture.

Referring now to FIG. 3, another embodiment of the system and method creates a dense slurry "S" of waste material and a weighting material as needed, and uses this mixture to create a gravity fracture 40 that propagates downward from the bottom of the boring 20. This provides a mechanism to isolate solid or liquid materials. Regarding gravity fractures and a dense slurry or fluid, this application incorporates by reference the subject matter of the following patent applications and patents: U.S. patent application Ser. No. 14/942,643 filed Nov. 16, 2015, which was a continuation of U.S. patent application Ser. No. 14/129,504 filed Dec. 26, 2013 (now U.S. Pat. No. 9,190,181 B2), which claims priority to PCT Pat. Appl. No. US2012/045084 filed Jun. 29, 2012, which claims priority to U.S. Pat. Appl. No. 61/502,557 filed Jun. 29, 2011.

The solid materials would be small particles that are small enough to enter a gravity fracture 40. Liquid materials could be liquid metals, or slurries containing small dense particles. Liquid metals could be low melting temperature metals used in the reactor, for example, to transfer heat. Liquid materials could also be molten nuclear fuel or other components of the reactor core released during the meltdown. When the temperature of the liquid metal is greater than the boiling point of water, the borehole 20 needs to be nearly dry to avoid explosion.

The density of the fluid used in this embodiment preferably exceeds that of the rock over the entire fracture 40. Therefore, the weighting material is selected so that a density of the fluid exceeds that of the rock formation enveloping the gravity fracture 40 (e.g. $\geq 3.0$ g/cm$^3$). The types of weighting material suitable for this purpose are described in the above referenced patent applications, incorporated by reference herein. In cases in which the nuclear material to be disposed of is melted metal, the material could be heavy enough to propagate the gravity fracture downward on its own without adding the weighting material. Where the material to be disposed of includes contaminated water, adding a weighting material is mostly likely required.

The process could be repeated by putting additional fluid into the well several or many times. The additional fluid could inflate or remobilize the existing gravity fractures or it could create a new gravity fracture. The maximum depth that could be reached by dense fluids is only limited by the weight of the disposed material and the resistance to fracture propagation at depth, but it could exceed tens of kilometers. In many situations involving meltdown, the volume of material required for disposal would limit the depth of propagation of a gravity fracture to less than tens of kilometers or even to less than a kilometer below the bottom of the borehole.

When there are two or more episodes of injection (disposals) then by the second episode the material in the fracture may be immobile. In this case, additional material is injected into the borehole and a second gravity fracture propagates right through or along the original gravity fracture or somewhat apart from it, but still downwards. The same borehole or different boreholes could be used for disposal and re-fracturing during the same meltdown or subsequent meltdowns.

At the bottom of the borehole, a small slot could be cut or a small conventional hydraulic fracture could be made and used as a "notch" or a "seed" to nucleate the gravity fracture that would be created by the melted material itself. Such a starter notch could be created by other means, for example, hydro-jetting, thermal fracturing, or other means. It is also possible that a conventional hydraulic fracture could be created in advance to localize and initiate the hydraulic fracture created by the molten material or related waste.

The gravity fracture propagates further downward as the dense fluid, whose density is greater than that of the rock, creates a stress intensity that is sufficient to cause propagation at the leading, lower end of the fracture. This causes an absolute tendency for the fluid to travel downward until it becomes immobilized. The dense fluid may contain contaminated water.

The dense fluid flows into the pre-existing fracture and the level of fluid in the well drops. Because the fracture advances faster than the rate of drop of fluid level in the well, the overall height from the tip of the fracture to the top of the fluid column in the well lengthens. This increases the driving pressure and furthers downward propagation as the fluid in the wellbore drains by gravity into the fracture.

The vertical span of the fracture continuously increases, causing the pressure at the bottom of the fracture to increase and ensuring continued downward propagation, even after all the liquid has drained from the well into the fracture. Molten material could solidify on portions of the fracture wall.

The geometry of the radioactive material in the subsurface could be a factor affecting disposal safety. Disposing of melted radioactive material in a thin layer is preferred because the rate of heat transfer away from a thin layer is faster than it is away from a thick layer or cylinder and this reduces the increase in temperature caused by the energy release due to the radioactive decay. Limiting the temperature change will reduce the convective flow of groundwater near the radioactive material. Forming the waste into a thin layer will also reduce interactions with nuclear material that cause or sustain criticality. Placing the material in a thin gravity fracture would cause a loss of criticality and effectively arrest the meltdown process.

Figure 5B:
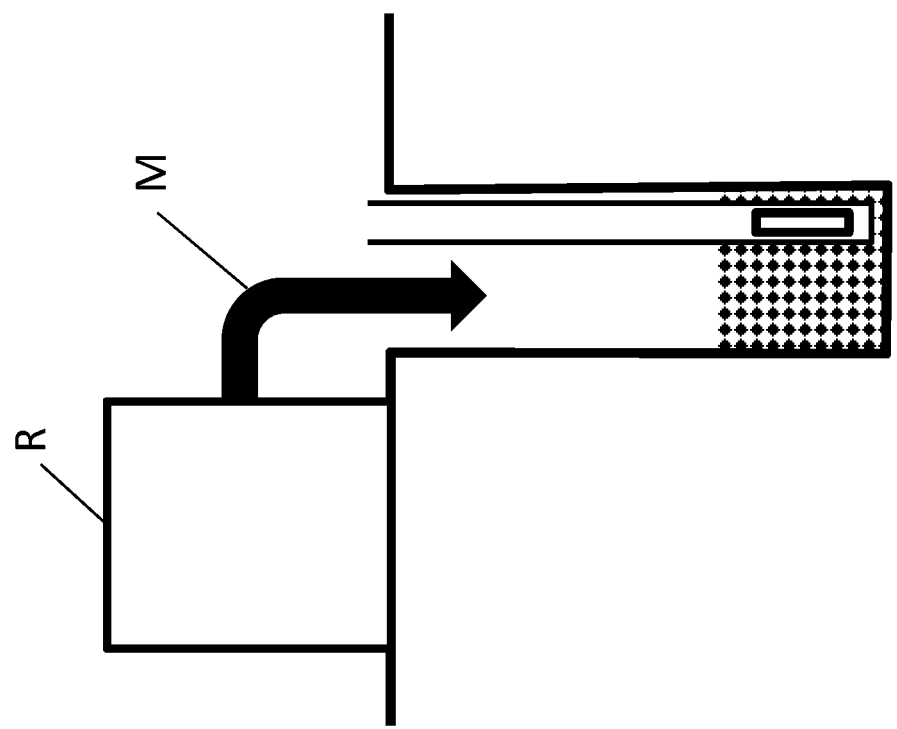
FIG. 5B a schematic of an embodiment in which hot material or water could flow into the borehole by gravity or by other means that do not require a power supply. The borehole is placed either directly below or in close proximity to the source of contaminated or radioactive material.
Figure 5A:
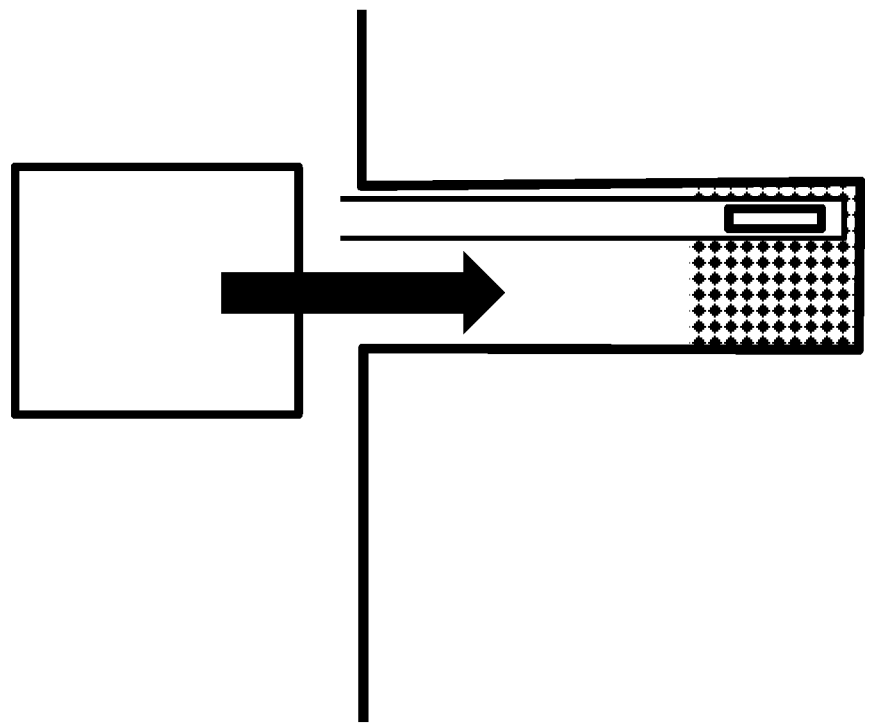
FIG. 5A is a schematic of an embodiment in which the borehole used for emergency isolation of hot material is in proximity to a reactor or another potential source of the material. Material would be conveyed to the borehole for isolation during an emergency.

Referring now to FIG. 5A, the boreholes 20 could be situated in the vicinity of a reactor R and material M, S, or W conveyed to the borehole for emergency isolation. This would provide the most flexibility for siting the borehole 20. Pressurized air or another pressurized fluid could be used to transport the removed nuclear material and contaminated water along a piping or conduit system and to the borehole, where it is mixed with the weighting material prior to injection as needed. A chemical propellant could be used to convey the removed material into the borehole. For example, the pressurized air or propellant and the weighting material could be placed on site so each is readily available when needed. The dense fluid could be injected sidewise into the borehole or injected in other ways, including at the bottom of the borehole.

In FIG. 5B, the borehole 20 is located in close proximity, or beneath the reactor or potential source of contaminant. The close proximity would facilitate placing material in the borehole during an emergency. This could be done by opening the borehole and allowing material to move into the borehole by gravity alone. Placing material in the borehole using pumps or other engineered conveyance methods is preferred, but these methods may be inoperable during an emergency, for example, if the electricity or another power source are not available. Siting the borehole in close proximity would facilitate its use during an emergency. The borehole could be covered with a structural plate during normal operation of the reactor.

A second borehole also could be situated next to or near the reactor for regular, planned disposal of nuclear waste. This same borehole could be used to dispose of material previously stored in glass containment, with the glass and material being ground up and disposed of in the bore. The density of the material would be such that gravity fracturing occurs.

Figure 6:
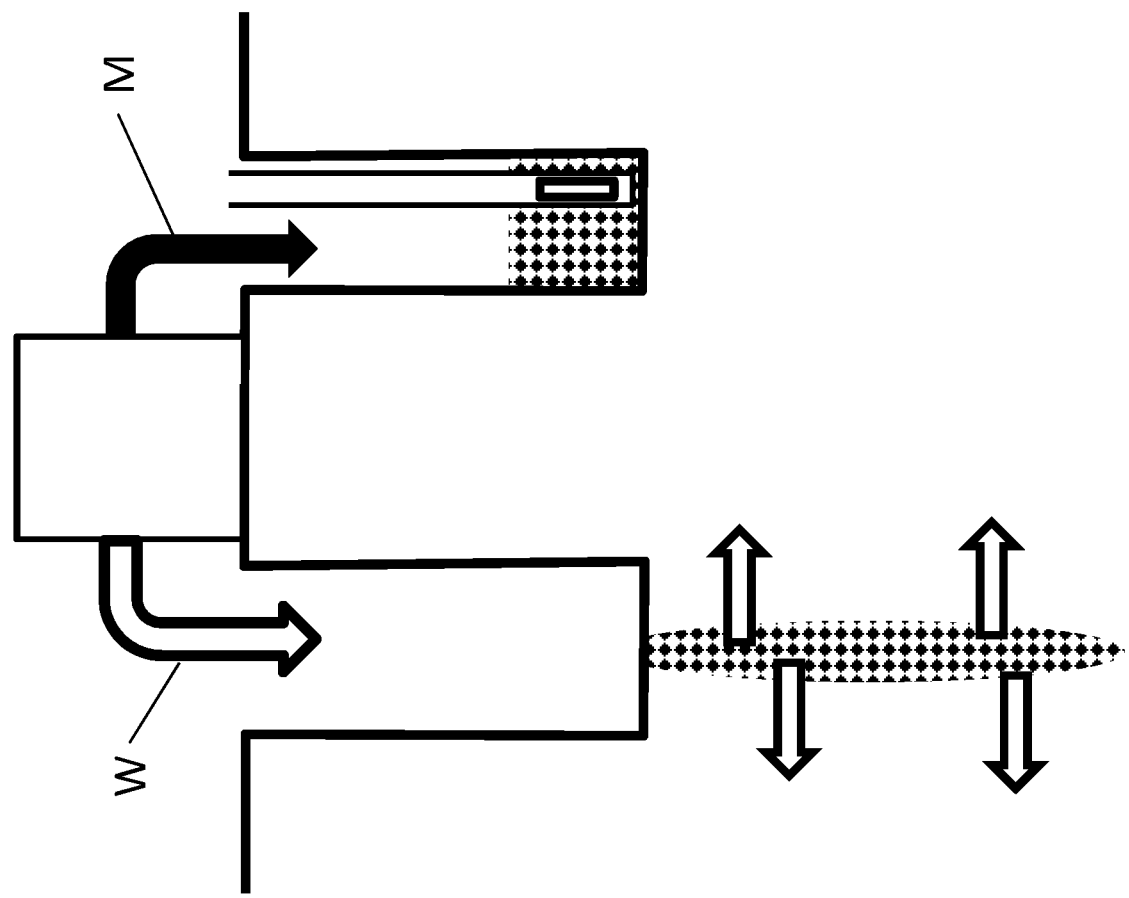
FIG. 6. shows two boreholes in close proximity or beneath a potential contaminant source such as but not limited to a nuclear reactor. The boreholes are used for emergency isolation of hazardous materials. One borehole is kept dry and is used to isolate hot material. The other borehole intersects a hydraulic fracture or a geologic formation of sufficient permeability to allow water to flow into it fast enough in order to be isolated during an emergency.

Referring to FIG. 6, in another preferred embodiment at least two boreholes 20 are used. One borehole could be used for solid material and the other for liquids.

Embodiments of a system and method for in-situ disposal and containment of nuclear material at a nuclear power facility have been described and illustrated. The inventive system and method itself is defined by the following claims, including the full range of equivalents to which the recited elements and limitations are entitled.

What is claimed is:

1. A system for emergency in-situ subsurface isolation of mobile radioactive material from a source of the mobile radioactive material, the system comprising:
   a borehole located in proximity to, and in flow communication with, the source of mobile radioactive material, the borehole being at a depth suitable for safely isolating the mobile radioactive material;
   a conduit system connecting the source of the mobile radioactive material and the borehole and;
   a prepared first man-made vertical-oriented gravity fracture located in a surrounding rock formation below and in communication with a bottom end of the borehole and available to receive the mobile radioactive material exiting the bottom end of the borehole during the emergency, the first man-made vertical-oriented gravity fracture made using a slurry containing a weighting material, the slurry being denser than the surrounding rock formation and not including the mobile radioactive material;
   wherein during the emergency, the mobile radioactive material enters the borehole and from the borehole into the man-made vertical-oriented gravity fracture.

2. A method according to claim 1, wherein the slurry has an absolute tendency to travel vertically downward in the surrounding rock formation.

3. A system according to claim 1, wherein at least a portion of the mobile radioactive material is mixed with a weighting material to produce a fluid or a slurry sufficiently dense to cause additional vertical downward propagation of the man-made vertical-oriented gravity fracture.

4. A system according to claim 1, further comprising a layer of porous material located at the bottom end of the borehole.

5. A system according to claim 1, further comprising artificial lift pumping means located at the bottom end of the borehole.

\* \* \* \* \*